United States Patent
Krishna et al.

(10) Patent No.: US 9,471,325 B2
(45) Date of Patent: Oct. 18, 2016

(54) METHOD AND APPARATUS FOR SELECTIVE RENAMING IN A MICROPROCESSOR

(71) Applicant: QUALCOMM Incorporated, San Diego, CA (US)

(72) Inventors: Anil Krishna, Raleigh, NC (US); Sandeep Suresh Navada, Knightdale, NC (US); Niket Kumar Choudhary, Raleigh, NC (US); Michael Scott McIlvaine, Raleigh, NC (US); Thomas Andrew Sartorius, Raleigh, CA (US); Rodney Wayne Smith, Raleigh, NC (US); Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 14/091,340

(22) Filed: Nov. 27, 2013

(65) Prior Publication Data
US 2015/0019843 A1  Jan. 15, 2015

Related U.S. Application Data

(60) Provisional application No. 61/845,476, filed on Jul. 12, 2013.

(51) Int. Cl.
G06F 9/38 (2006.01)

(52) U.S. Cl.
CPC ............ *G06F 9/384* (2013.01); *G06F 9/3824* (2013.01); *G06F 9/3842* (2013.01); *G06F 9/3855* (2013.01); *G06F 9/3861* (2013.01)

(58) Field of Classification Search
None
See application file for complete search history.

(56) References Cited

U.S. PATENT DOCUMENTS

| | | | | |
|---|---|---|---|---|
| 5,613,151 A * | 3/1997 | Dockser | ............. | G06F 9/30098 711/202 |
| 5,694,564 A * | 12/1997 | Alsup | ................... | G06F 9/3836 711/133 |
| 5,740,414 A * | 4/1998 | Tovey | ................... | G06F 9/3836 712/233 |
| 5,764,970 A * | 6/1998 | Rana | ....................... | G06F 9/384 712/233 |
| 5,996,068 A * | 11/1999 | Dwyer, III | ............ | G06F 9/3851 712/217 |
| 6,061,777 A * | 5/2000 | Cheong | ................. | G06F 9/3863 712/205 |
| 6,092,175 A * | 7/2000 | Levy | ................... | G06F 9/30076 712/215 |
| 6,356,918 B1* | 3/2002 | Chuang | ................. | G06F 9/3836 |
| 7,506,139 B2 | 3/2009 | Burky et al. | | |
| 7,809,930 B2 | 10/2010 | Piry et al. | | |
| 8,335,912 B2 | 12/2012 | Golla et al. | | |
| 2008/0114966 A1 | 5/2008 | Begon et al. | | |
| 2008/0148022 A1* | 6/2008 | Piry | ........................ | G06F 9/384 712/217 |
| 2010/0205409 A1 | 8/2010 | Zhu et al. | | |
| 2012/0005444 A1 | 1/2012 | Rupley et al. | | |
| 2012/0265969 A1 | 10/2012 | Alexander et al. | | |

OTHER PUBLICATIONS

International Search Report and Written Opinion—PCT/US2014/046297—ISA/EPO—Sep. 16, 2014.

* cited by examiner

*Primary Examiner* — Eric Coleman
(74) *Attorney, Agent, or Firm* — Muncy, Geissler, Olds & Lowe, P.C.

(57) ABSTRACT

A method and apparatus for allowing an out-of-order processor to reuse an in-use physical register is disclosed herein. The method and apparatus uses identifiers, such as tokens and/or other identifiers in a rename map table (RMT) and a physical register file (PRF), to indicate whether an instruction result is allowed or disallowed to be written into a physical register.

30 Claims, 6 Drawing Sheets

METHOD AND APPARATUS FOR SELECTIVE RENAMING IN A MICROPROCESSOR

CLAIM OF PRIORITY UNDER 35 U.S.C. §119

The present application for patent claims priority to Provisional Application No. 61/845,476 entitled Method and Apparatus for Selective Renaming in a Microprocessor filed Jul. 12, 2013, and assigned to the assignee hereof and hereby expressly incorporated by reference herein.

FIELD OF DISCLOSURE

Aspects of the present disclosure relate generally to processors, and more particularly, to selective renaming in a microprocessor.

BACKGROUND

Register renaming is a common process when processing a stream of instructions in a processor. For example, instructions generate architected registers according to the instruction set architecture. The architected registers are renamed to physical registers, which store the results of the instructions.

A rename map table (RMT) maps the architected registers to the physical registers. As a program executes, architected registers continually get mapped to physical registers, and the number of physical registers available for storing results can be depleted quickly. Therefore, the design of the processor has to provide many physical registers to ensure that every new generation of an architected register by an instruction has a physical register into which to place the result.

This by itself can be problematic because the standard solution is to have a large physical register file (PRF) that is highly ported. Having a highly ported PRF can affect the cycle time of the processor, the power consumption of the processor, as well as the clock speed of the processor, i.e., how fast or slow the processor runs.

Thus, improved apparatuses and methods for register renaming are desired so that the PRF can be as small as possible.

SUMMARY

Example implementations of the invention are directed to systems, methods, and non-transitory computer-readable storage medium including data that, when accessed by a machine, cause the machine to perform a method for selective renaming in a microprocessor (and/or processor). For example, in one or more implementations, a method of operating a processor operates by obtaining a first producer instruction. The first producer instruction includes a first producer instruction result. The first producer instruction also includes a first identifier. The first identifier may include an instruction sequence identifier. The first identifier may include a token count.

The method also operates by generating a first generation of an architected register for the first producer instruction. Generating the first generation of the architected register for the first producer instruction includes identifying an entry in a Rename Map Table (RMT) corresponding to the first generation of the architected register for the first producer instruction.

The method operates further by assigning a physical register to the architected register. Assigning the physical register to the architected register includes identifying a physical register entry in the Rename Map Table (RMT) that is associated with the first generation of the architected register for the first producer instruction.

The method operates further by obtaining a second producer instruction. The second producer instruction includes a second producer instruction result and a second identifier. The second identifier may include an instruction sequence identifier. The second identifier may include a token count.

The method operates further by generating a second generation of the architected register and assigning the physical register to the second generation of the architected register.

The method operates further by allowing the second producer instruction result to be written to the first physical register if the second identifier corresponds to the first identifier. The method also operates by disallowing the second producer instruction result to be written to the first physical register if the second identifier does not correspond to the first identifier.

In one or more implementations, the method operates further by assigning a new physical register to the second generation of the architected register and freeing the physical register if the new physical register is the same as the physical register.

The processor can be an out-of-order processor. The first producer instruction can be a potential pipeline flush instruction. In some implementations, the architected register is defined by an instruction set architecture.

In one or more implementations, the method operates by determining that the first producer instruction is a potential pipeline flush instruction and resetting the first and second identifiers in response to the determination that the first producer instruction is a potential pipeline flush instruction.

One or more implementations include a processor that is configured to process instructions in a pipeline to generate at least one architected register and at least one instruction result. The processor may include a rename map table (RMT). The RMT may include at least one entry that maps at least one architected register to at least one physical register, respectively. At least one entry in the RMT includes an RMT identifier.

The processor also may include a physical register file (PRF). The PRF may include at least one entry representing the least one physical register. The at least one entry in the PRF may include a PRF identifier.

The processor may include an execution module that is configured to allow the instruction result to be written to the physical register if the PRF identifier corresponds to the RMT identifier. The execution module also may disallow the instruction result to be written to the physical register if the PRF identifier does not correspond to the RMT identifier.

In alternative implementations, a method of operating a processor operates by obtaining a first producer instruction from a processor pipeline. The first producer instruction may include a first producer instruction result. The processor pipeline may include a data forwarding network. The method of operating the processor may operate further by generating a first generation of an architected register for the first producer instruction and obtaining a second producer instruction. The second producer instruction may include a second producer instruction result. The method may operating the processor may operate further by generating a second generation of the architected register, assigning a physical register to the second generation of the architected, allowing the second producer instruction result to be written to the physical register, and allowing the first producer instruction result to be read from the data forwarding network.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The accompanying drawings are presented to aid in the description of implementations of the technology described herein and are provided solely for illustration of the implementations and not limitation thereof.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
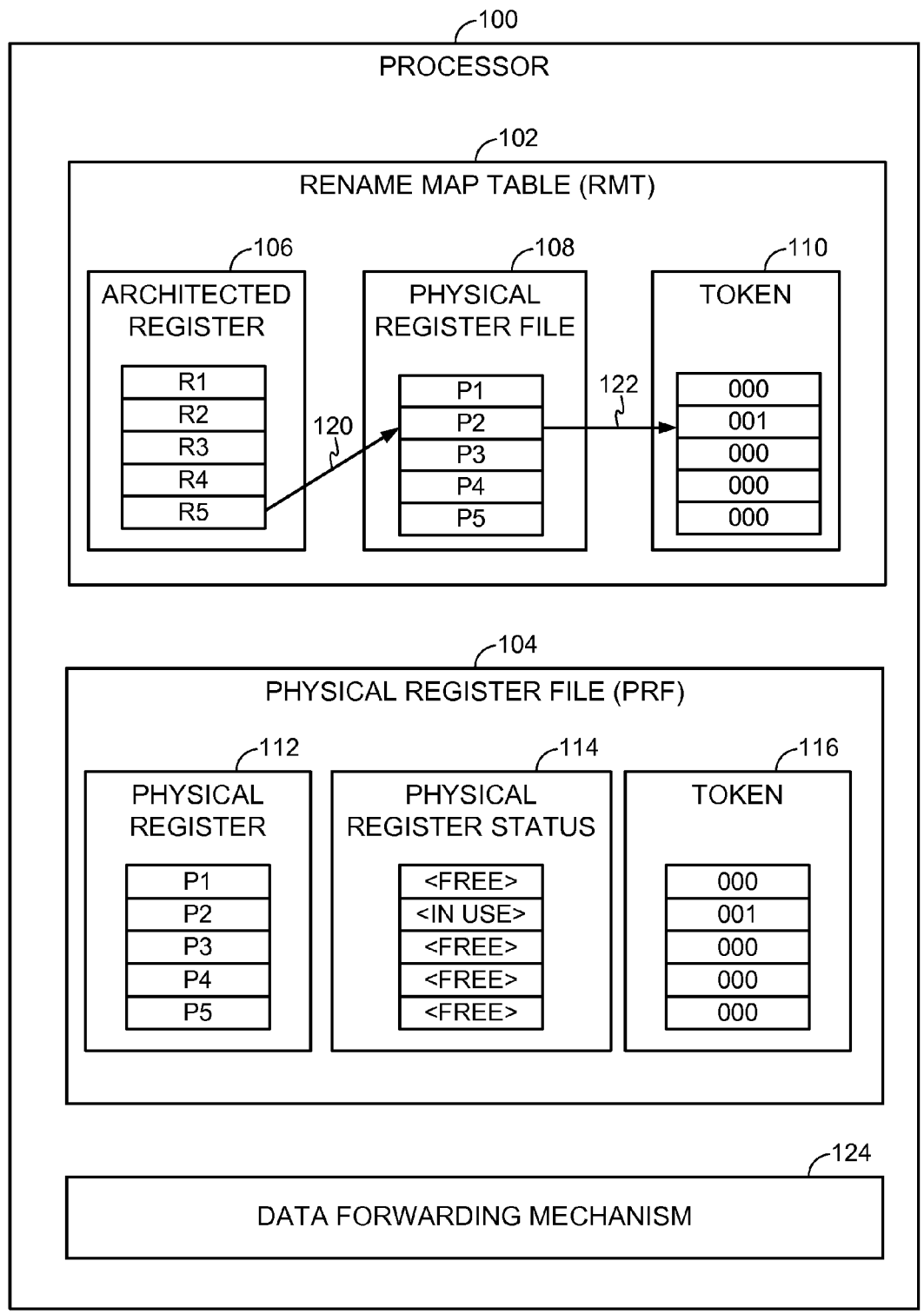
FIG. 1 is a block diagram of an example processor according to one or more implementations.

In general, one implementation of the subject matter disclosed herein is directed to selective register renaming in an out-of-order processor (and/or microprocessor) to improve the cycle time of the processor, the power consumption of the processor, as well as the clock speed of the processor, i.e., how fast or slow the processor runs. In register renaming, when an architected register is generated for the first time by an instruction it is renamed to a different name, i.e., a physical register name, based on the Instruction Set Architecture (ISA) for the particular processor. When the architected register is generated a second time by an instruction, the second generation of the architected register is typically assigned a new physical register that is different from the previously assigned physical register. In this manner, the processor can now execute the production and consumption of the instruction result for the previous physical register in parallel, or out-of-order, with the production and consumption of the instruction result for the new physical register. This process tends to speed up the operation of the processor.

A rename map table (RMT) maps the name of the architected register to the assigned physical register so that a producer/consumer pair for an instruction's result knows to look to the renamed physical register for writing/reading. When a second generation of an architected register is assigned a new physical register the RMT is updated accordingly so that the second producer/consumer pair knows to look to the renamed physical register for writing/reading.

One problem that exists with this renaming process is that every generation of the same architected register is assigned a different physical register. That is, each producer/consumer pair is assigned a different physical register. As a result, either the processor quickly runs out of physical registers or the physical register file (PRF) becomes quite large.

According to one or more implementations described herein, the size of the PRF can be reduced because during register renaming physical registers are reused. In one or more implementations, physical register reuse is accomplished utilizing potential pipeline flush (PPF) instructions, potential recovery points, or the like. PPF instructions are instructions where the processor is speculating at instruction fetch time what the next instruction is going to be.

A conditional branch instruction is an example of a PPF instruction. With a conditional branch instruction the processor does not know whether the branch is going to be taken until the instruction actually executes. Since it is not optimal for the processor to wait until actual execution, because it takes many cycles for the instruction to complete, for example, a branch predictor is used to speed up the process by speculating or guessing which branch will ultimately be taken and fetching the instructions from the target address that is provided by the branch predictor.

If it turns out that the branch prediction was incorrect and the instructions fetched in response to the branch prediction should not have been executed, the processor attempts to recover its state to the point where the speculation was in error. That is, the processor will attempt to pretend as if nothing happened beyond the PPF instruction and the processor will try to reconstruct its state as it was exactly at the PPF instruction.

Another example of a PPF instruction is a memory operation (i.e., a load or store) that suffers a miss in a translation lookaside buffer (TLB) and causes a page fault, and requires control to switch to operating system code that can then load the correct translation into the TLB.

In one or more implementations described herein, there are two PPF instructions in the pipeline, with non-PPF instructions in between them. In this case, there is no reason why the processor state would ever have to land between the two PPF instructions. The processor state will land at the first PPF instruction if it needs to recover to the first PPF instruction or land at the second PPF instruction if it needs to recover to the second PPF instruction. The processor state will not have to recover to any points in between the two PPF instructions, such as where the architected register was renamed to a physical register for the first time.

Additionally, if the result written in the assigned first physical register has already been consumed, then the next generation of the architected register, which would normally be assigned a new physical register that is different from the previous physical register, does not need to be assigned a new physical register. According to implementations described herein, the next generation of the architected register can reuse the previous physical register. That is, the processor, knowing that there is no PPF instruction between the previous generation of the architected register and the next generation of the architected register, can assign the previous physical register to the next producer/consumer pair that occurs.

Note that other generations of architected registers generated by instructions that occur between two PPF instructions can be assigned the same physical registers as well. Thus, if there are multiple generations of an architected register from multiple instructions, each architected register can be assigned the same physical register instead of assigning multiple physical registers for the multiple architected registers. This is the mechanism by which implementations described herein allow the size of the PRF to be reduced. Implementations described herein also save processor power, improve processor clock frequency, etc.

To illustrate this concept, suppose that in one scenario a first producer instruction knows, by looking in the RMT, that a first physical register has been assigned to a first generation of an architected register. The first producer instruction thus knows that it is to write its result to the first assigned physical register. Likewise, a first consumer instruction knows, by looking in the RMT, that it is to read the first producer instruction's result from the first assigned physical register. If the result that the first consumer is to read has already been written to the first assigned physical register, the first consumer merely reads the result that has been written into the first assigned physical register by the first producer. The first consumer of the first producer's result that was written in the first assigned physical register has accomplished its task and thus the result that was written to the the first assigned physical register by the first producer is no longer needed.

When a second generation of the first architected register occurs, the second generation of the first architected register is guaranteed that there are no other consumers for the first producer's result. Moreover, all future generations of the first architected register will look to the second assigned physical register to read their result because the result in the first assigned physical register has already been consumed. Again, the result that was written to the first assigned physical register by the first producer is no longer needed.

In an alternative scenario, a first producer of a result knows, by looking in the RMT, that a first physical register has been assigned to a first architected register. The first producer of the result thus knows that it is to write the result to the first assigned physical register. Likewise, a first consumer of the result knows, by looking in the RMT, that it is to read the result from the first assigned physical register. However, if the result that the first consumer is to read has not already been written to the first assigned physical register because the first producer of the result has not yet completed, the first consumer of the result can wait for the result from the first producer to become available in the first assigned physical register. Waiting, however, among other things, slows down the processor.

In one or more implementations described herein, instead of having the first consumer of the result wait for the first producer of the result to write its result to the first assigned physical register, the first consumer of the result obtains the result directly from a forwarding network in the processor. That is, the first consumer of the result does not need to read the result from the first assigned physical register. Instead, the first consumer of the result obtains the result from one of the forwarding paths of the processor's forwarding network before the result is written to the first assigned physical register.

Thus, when the second generation of the first architected register occurs, the result that the first assigned physical register stored for the first generation of the first architected register is not needed by the first consumer because either the first consumer has already read the result that is stored first assigned physical register by the time the second generation of the first architected register occurs (first scenario) or the first consumer has already obtained the result from the forwarding network (second scenario). Therefore, the first assigned physical register is now free for reuse by the second generation of the first architected register. In this manner, the second generation of the first architected register is assigned the same physical register name that the first generation of the first architected register was assigned. That is, the name of the first assigned physical register is reused for the second generation of the first architected register.

Example Rename Map Table (RMT) and Physical Register File PRF

FIG. 1 illustrates a block diagram of an example processor 100 according to one or more implementations described herein. The illustrated processor 100 is an out-of-order processor that utilizes selective register renaming during execution of instructions in the instruction pipeline. It is known that a conventional processor, such as the illustrated processor 100, includes a pipeline that receives data from a data cache and instructions from an instruction cache. A controller typically controls various stages and execution units (such as a fetch stage, a decode stage, etc.) within the pipeline to decode and execute instructions. Results from the executed instructions when they complete may be stored in a register file, in a data cache, and in other buffers or memory units.

The illustrated processor 100 includes a selective register renaming mechanism, which changes register names from architected register names to physical register names. This may be done to eliminate processor performance-sapping data hazards such as read-after-write (RAW) data hazards and write-after-write (WAW) data hazards.

The illustrated register renaming mechanism includes a rename map table (RMT) 102. In one or more implementations, the RMT 102 is any suitable mechanism that maps architected registers to physical registers in a processor. The RMT 102 is capable of being dynamically updated to reflect new mappings of architected registers to physical registers, including dynamically updating of identifiers such as tokens, token counts, sequence identifiers, and the like.

For example, when an instruction is to write a result to a physical register, the allocated or assigned physical register location for the instruction result is recorded in the RMT 102. When an instruction is to read a result from a physical register, the RMT 102 is consulted to determine the allocated or assigned physical register location where the instruction result is to be recorded. It is to be noted that architected registers are not actual physical locations within the processor 100. Instead, architected registers are the names of registers generated by processor's instructions according to the ISA for a particular processor.

The illustrated register renaming mechanism includes a physical register file (PRF) 104. In one or more implementations, the PRF is a file including the physical registers that are implemented in the processor 100 hardware. Physical registers hold results of instructions that have already committed as well as results of subsequent instructions that have not yet committed. Typically there are many more physical registers than architected registers.

The illustrated RMT 102 includes an architected register column 106 and a physical register name (PRN). The architected register column 106 is not a physical entity. Instead, the architected register column is just indicative of an index used to access a corresponding entry in the PRN column 108. The PRN column 108 is indexed by the name of an architected register.

The PRN column 108 includes physical registers P1-P5, though typically there are many more physical registers than architected registers. Architected registers R1-R5 are renamed to physical registers P1-P5 in this example. In one or more implementations, using identifiers, such as tokens and/or instruction sequence IDs (e.g., Re-Order Buffer ID, Matrix ID, etc.), an architected register can reuse an already in-use physical register.

For example, the illustrated RMT 102 includes a token column 110. In the illustrated embodiment, the tokens in the token column 110 are three bits long, although according to implementations the tokens can be any number of bits, such as one bit, two bits, ten bits, and so forth.

The illustrated PRF 104 includes a physical register column 112. The physical register column 112 includes physical registers P1-P5, although typically there are many more physical registers.

The illustrated PRF 104 includes a physical register status column 114 indexed by the name of a physical register. The physical register status column 114 indicates whether a particular physical register is free or in use. For example, in the illustrated example the physical register status column 114 indicates that the physical register P2 is <in use> and all other physical registers are <free>. The <in use> designation indicates that the physical register has been assigned to an architected register and that the generating instruction is to write its result into that assigned physical register. According to implementations, physical registers that are <in use> can be reused by another generation of an architected register. The <free> designation indicates that the physical register has not been assigned to an architected register and that the generating instruction can be assigned that physical register. According to implementations, physical registers that are <in use> can be reused by another generation of an architected register.

The illustrated PRF 104 includes a token column 116. The tokens in the token column 116 are three bits long, although according to embodiments the tokens can be any number of bits, such as one bit, two bits, ten bits, and so forth. The token for the physical register P2 in the token column 116 also has its least significant bit set to "1."

In the example illustrated in FIG. 1, an arrow 120 indicates that the architected register R5 has been renamed (or mapped to) physical register P2, and an arrow 122 indicates that the token for physical register P2 has its least significant bit set to "1."

The illustrated processor 100 includes a data forwarding mechanism 124. The illustrated data forwarding mechanism 124 allows data-dependent instructions to be executed in consecutive cycles. For example, the data-forwarding mechanism 124 enables data to be sent directly between functional units in the processor 100, bypassing the PRF.

Example Selective Register Renaming Apparatus

Recall from the discussion above that according to implementations the second generation of the first architected register is assigned the same physical register that the first generation of the first architected register was assigned. Typically, however the first producer of the first generation of the architected register does not know that the first assigned physical register has also been assigned to the second generation of the architected register. According to one or more implementations described herein, the illustrated processor 100 determines under what circumstances a producer instruction is allowed to write its result into a particular physical register and under what circumstances a consumer instruction is allowed to read a result from a particular physical register.

Figure 2:
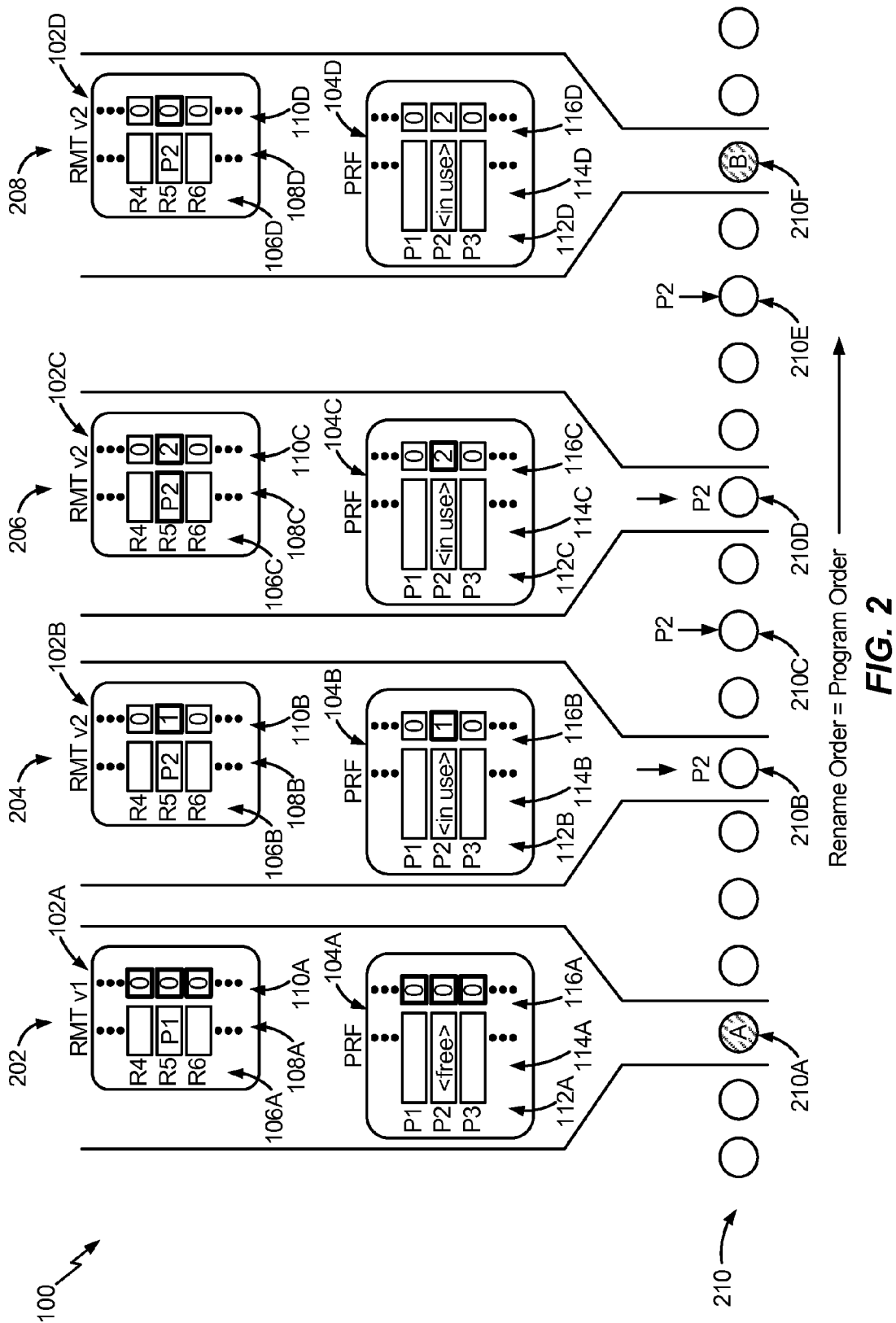
FIG. 2 is a diagram of the example processor depicted in FIG. 1 in more detail according to one or more implementations.

FIG. 2 illustrates a block diagram of the processor 100 according to one or more implementations described herein in which the processor determines under what circumstances a producer instruction is allowed to write its result into a particular physical register and under what circumstances a consumer instruction is allowed to read a result from a particular physical register.

The illustrated processor 100 includes several versions of the RMT 102: 102A, 102B, 102C, and 102D. The illustrated processor 100 also includes several versions of a PRF 104: 104A, 104B, 104C, and 104D. The PRFs are the physical register files where results are written once a producer instruction is complete with its execution.

Each version 102A, 102B, 102C, and 102D of the RMT includes respective architected register column 106A, 106B, 106C, and 106D.

Each version 102A, 102B, 102C, and 102D of the RMT includes respective PRN columns 108A, 108B, 108C, and 108D. The PRN columns 108A, 108B, 108C, and 108D are indexed by the name of an architected register (R4, R5, and R6). The architected register column is not a physical entity, but rather is indicative of the index used to access the corresponding entry in PRN columns 108A, 108B, 108C, and 108D. In the illustrated implementation, three architected registers are shown and three physical registers are shown. Typically, however, there are many more physical registers than architected registers.

Each version 102A, 102B, 102C, and 102D of the RMT is appended with respective token columns 110A, 110B, 110C, and 110D. The token columns 110A, 110B, 110C, and 110D include bits that are used to determine whether a producer is allowed to write a result to a physical register.

In the illustrated implementation, the tokens in the token columns 110A, 110B, 110C, and 110D are one bit long, although according to other implementations described herein the tokens can be any number of bits, such as three bits, two bits, ten bits, and so forth. For example, the number of bits per token may depend on the number of productions of an architected register that are expected to occur between two PPF instructions, two potential recovery points, or the like, such as branch instructions. In some instances, two bits per token may suffice if, on average, no more than four renames of a given architected register between two PPFs is expected. In one or more implementations described herein, all token counts start at "0."

Each version 102A, 102B, 102C, and 102D of the RMT includes respective physical register columns 112A, 112B, 112C, and 112D. The illustrated physical register columns 112A, 112B, 112C, and 112D include three physical registers P1-P3. However, typically there are many more physical registers.

Each version 102A, 102B, 102C, and 102D of the RMT includes respective physical register status columns 114A, 114B, 114C, and 114D. The physical register status columns 114A, 114B, 114C, and 114D are indexed by the name of a physical register (P1, P2, and P3). The physical register status columns 114A, 114B, 114C, and 114D indicate whether a particular physical register is free or in use.

Each version 102A, 102B, 102C, and 102D of the RMT includes respective token columns 116A, 116B, 116C, and 116D. The token columns 116A, 116B, 116C, and 116D include bits that are used to determine whether a producer is allowed to write a result to a physical register.

The processor 100 illustrated in FIG. 2 fetches a stream of instructions 210 in program order and executes the instructions in any order. In the illustrated implementation, the processor 100 is processing the instructions 210A, 210B, 210C, 210D, 210E, and 210F. In the illustrated example, instructions 210B and 210D are producer instructions, as indicated by the arrows pointing into the physical register P2 in the instruction stream 210. Instructions 210C and 210E are consumer instructions, as indicated by the arrow pointing out of the physical register P2.

In the example illustrated in FIG. 2, the instruction 210B and the instruction 210C constitute a producer/consumer instruction pair that is linked by the physical register P2. The processor 100 therefore waits to ensure that the producer instruction 210B has completed writing its result to physical register P2 before the consumer instruction 210C consumes the result in physical register P2. Similarly, instructions 210D and 210E constitute another producer/consumer instruction pair whose result is linked by physical register P2. As with the producer/consumer pair 210B/210C, the processor 100 waits to ensure that the producer instruction 210D has completed writing its result to physical register P2 before the consumer instruction 210E consumes the result in physical register P2.

Also in the example illustrated in FIG. 2, instructions 210A and 210F are PPF instructions, potential recovery points, or the like, in which the processor 100 is speculating. Although instruction 210A and instruction 210F are PPF instructions there are no PPF instruction between instruction 210A and instruction 210F. Therefore, there is no reason why the processor 100 state would land between PPF instruction 210A and PPF instruction 210F. In a worst case scenario, the processor 100 state will either land on PPF instruction 210A if the state needs to recover to PPF instruction 210A, or land on PPF instruction 210F if the state needs to recover to PPF instruction 210F, but the processor 100 will not recover to instruction 210B, 210C, 210D, or 210E.

In the illustrated implementation, at a point 202 the architected register R5 (column 106A) has been assigned physical register P1 (column 108A) and its associated token count is "0" (column 110A). Also at point 202, the physical register P2 (column 112A) is indicated as being <free> (column 114A) and its associated token count is "0" (column 116A).

The RMT 102 token counts are reset to "0" upon encountering a PPF instruction (point 202). Therefore, when instruction 210A, which is a PPF instruction, is being renamed, all token counts in the RMT 102A are reset to "0." The token counts in PRF 104A are not changed. Although in FIG. 2 the token counts in PRF 104A are shown to all be "0" this is for illustration purposes. Only physical register P2, which is indicated as being <free>, need have its token set to "0."

When a first producer instruction that generates the architected register R5 is encountered at point 204, the token associated with architected register R5 in RMT 102A is checked. Since the token in RMT 102A is "0" the first instruction that generates the architected register R5 is assigned free physical register, which in the example illustrated in FIG. 2 is physical register P2. Physical register P2 is also entered to the RMT 102B as the new name for architected register R5. The token associated with architected register R5 in the RMT 102A is incremented to "1" and the first instruction that generates the architected register R5 carries the token=1 down into the processor 100 pipeline. The token associated with physical register P2 in the PRF 104A is incremented as well, making the token count in PRF 104B for physical register P2=1. With this in mind, consider three scenarios.

In a first scenario, a first producer instruction that generates the architected register R5 completes before the first consumer instruction arrives. In this scenario, the first producer instruction is allowed to write to physical register P2 because the first producer's token, which is "1," corresponds to and/or matches the token associated with physical register P2, which also is "1."

In a second scenario, a first consumer instruction arrives before the first producer instruction is complete. In this scenario, the consumer instruction can directly track the result in the processor 100 pipeline and obtain the result via a data bypass. The producer instruction may still be able to write its production to physical register P2, but the result written to physical register P2 is not used.

In a third scenario, a second producer instruction generates a second generation of the architected register R5 at point 206. The result of the second producer instruction arrives before the first producer instruction is complete. In this scenario, if the token count associated with the architected register R5 is greater than "0," a new physical register is not assigned, and the map entry in the RMT 102 for architected register R5 remains physical register P2. However, the token count associated with architected register R5 in the RMT 102 is incremented (e.g., to "2"). The token count associated with physical register P2 is also incremented (e.g., to "2"). The second producer instruction carries the token count of "2" along down into the processor 100 the pipeline. If the first producer instruction completes at any point in the future (either before or after the second producer instruction), the first producer instruction will not be allowed to write to physical register P2 because its token, which is "1," no longer corresponds to and/or matches the token associated with the physical register P2, which is "2."

When the PPF instruction 210F is encountered at point 208 the RMT 102C token counts are reset to "0," as indicated in RMT 102D, while the PRF 104C token counts are left unchanged, as indicated in PRF 104D.

When the first producer instruction commits, the previous mapping of architected register R5 is checked. Since the previous mapping, which is physical register P1, is different from the current mapping, which is physical register P2 the previous mapping of architected register R5 is freed for reuse. That is, physical register P2 is freed for use. In addition, the token count associated with the previous mapping of physical register P2 is reset to "0," as indicated in column 116A.

When the second producer instruction commits, the previous mapping of architected register R5 is checked. Since the previous mapping of architected register R5 (i.e., physical register P2) is the same as the current mapping (i.e., physical register P2), the previous mapping of architected register R5 i.e., physical register P2, is not freed.

Figure 3:
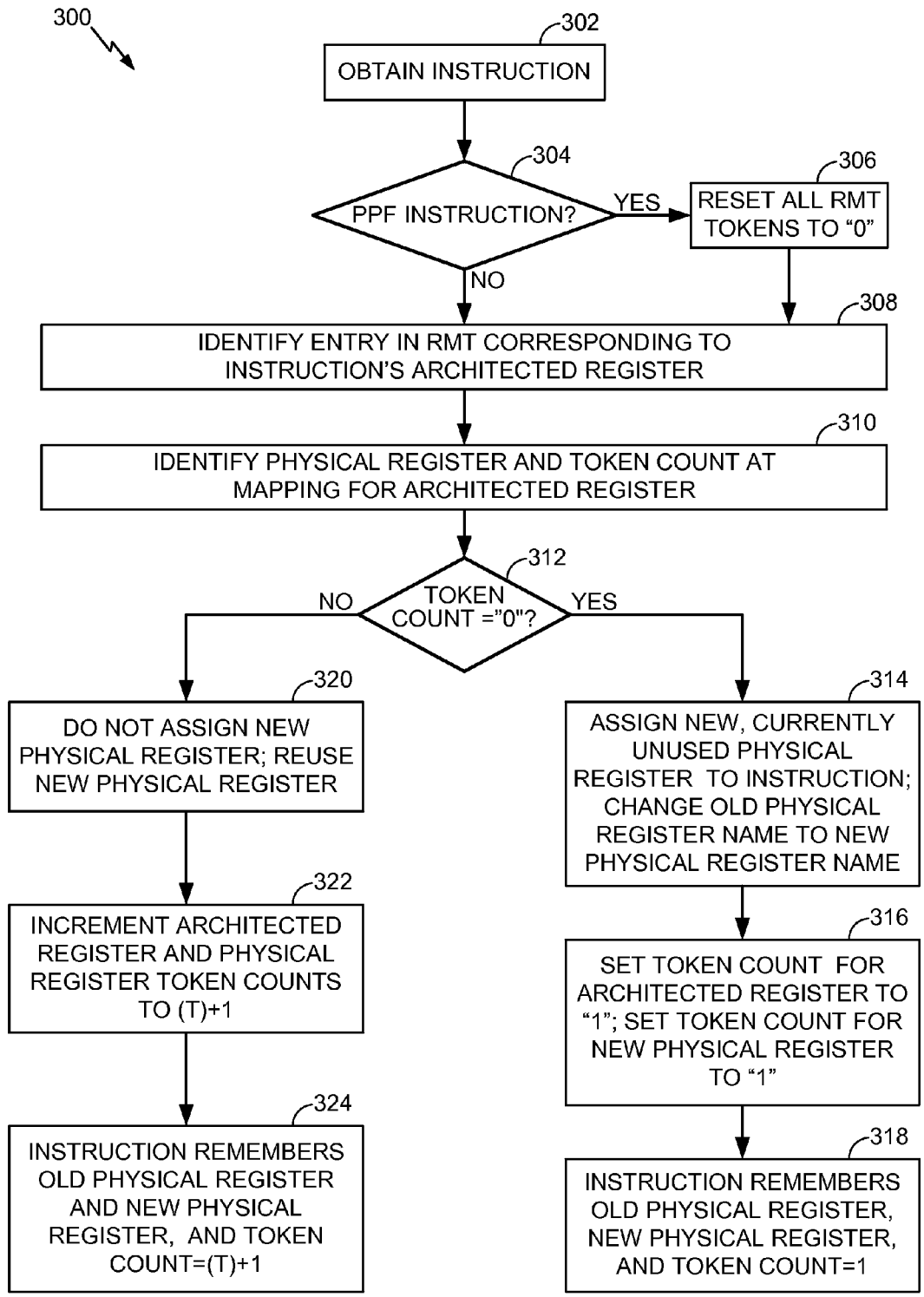
FIG. 3 illustrates an example flow diagram of a methodology for selective renaming in a processor at an instruction rename stage according to an implementation.

Example Token-Based Selective Register Renaming Method at Instruction Rename Stage FIG. 3 illustrates an example flow diagram of a method 300 for selective renaming in a processor at instruction rename time according to an implementation.

In a block 302, the method 300 obtains an instruction. The obtained instruction generates an architected register. In one or more implementations, the instruction is a producer instruction. In one instance a fetch unit (not shown) in the processor 100 fetches and decodes instruction from an instruction pipeline. Returning to FIG. 2, the processor 100 obtains instruction 210A from the pipeline.

In a block 304, the method 300 determines whether the obtained instruction is a PPF instruction. If in block 304 it is determined that the obtained instruction is a PPF instruction, control of the method 300 passes to a block 306. If, on the other hand, in block 304 it is determined that the obtained instruction is not a PPF instruction, control of the method 300 passes to a block 308.

In block 306 the method 300 resets all token counts in RMT 102A to "0." Resetting all of the token counts in the RMT 102A to "0" forces the method 300 to select new renames for this generation and all new productions. In keeping with the example illustrated in FIG. 2, the instruction 210A is a PPF instruction and at point 202 the token counts in column 110A are reset to "0."

In block 308, the method 300 identifies an entry in RMT 102A corresponding to the obtained instruction's architected register. In keeping with the example illustrated in FIG. 2, the method 300 identifies the architected register R5 entry in column 106A of the RMT 102A as corresponding to instruction 210A.

In a block 310, the method 300 identifies a physical register and a token count at the mapping in the RMT 102A for the instruction's architected register. In keeping with the example illustrated in FIG. 2, the method 300 identifies physical register P1 in the column 108A in the RMT 102A and token count "0" in the column 110A in the RMT 102A, which correspond to the architected register R5 in the RMT 102A.

In a block 312, the method 300 determines whether the token count="0" for the instruction's architected register. If the token count="0" for the instruction's architected register, control of the method 300 passes to a block 314.

In keeping with the example illustrated in FIG. 2, the method 300 determines that the token in column 110A of the RMT 102A="0," and control of the method 300 passes to block 314.

In block 314, the method 300 assigns a new, currently unused physical register from the PRF 104 column 112A to the instruction, renames the new, currently unused physical register, and changes the physical register to renamed physical register at position in the RMT 102A. In one or more implementations, the method 300 selects a new name, i.e., a free physical register, typically by consulting a free list. For example, the method 300 updates the RMT 102A entry for the architected register with the renamed physical register.

In keeping with the example illustrated in FIG. 2, the method 300 selects physical register P2, assigns physical register P2, which is unused (<free>) (column 114A), to instruction 210A, renames the new, unused physical register P2, and changes the physical register P1 (column 108A in RMT 102A) to P2 (column 108B in RMT 102B).

In a block 316, the method 300 sets the token count at the RMT 102A position for architected register to "1" and sets the token count at the PRF 104A position for the renamed physical register position to "1." For example, the method 300 increments the token count in the RMT 102A for the architected register by "1."

In keeping with the example illustrated in FIG. 2, the method 300 sets the token count in column 110A in RMT 102A for the architected register R5 and the physical register P2 to "1" and sets the token count for physical register P2 in column 116A to "1." This results in, at point 204, the token count in column 110B in RMT 102B for the architected register R5 and the physical register P2 being "1" and the token count for physical register P2 in column 116B of the PRF 104B being "1."

In a block 318, the method 300 ensures that the obtained instruction remembers the physical register, the newly assigned physical register, and that its token count="1."

In keeping with the example illustrated in FIG. 2, the method 300 ensures that the instruction 210A remembers that physical register P2 and the token count in column 110B have a result of "1." In one or more implementations, future producers of architected register R5 (e.g., instruction 210C) find that the token in RMT 102B for R5 is "1" and do not attempt to obtain a new physical register. Instead, the future producers use the same physical register (i.e., P2) as their destination.

However, the future producers do increment the token count in column 110B by "1" at RMT 102B and the corresponding physical register P2 in column 116B in PRF 104B. In keeping with the example illustrated in FIG. 2, when the method 300 obtains instruction 210C the token in column 110B is incremented by "1" to "2" (column 110C and column 116C).

If, on the other hand, the method 300 determines at block 312 that the token count≠"0" for the instruction's architected register, control of the method 300 passes to a block 320.

In keeping with the example illustrated in FIG. 2, at point 204, the physical register P2 (column 112B) is indicated as being <in use> (column 114B) and its associated token count is "1" (column 116B). Thus, at point 204 the token count is not "0" when the obtained instruction is instruction 210B. The token count is "1."

In block 320, the method 300 does not assign a new physical register from the PRF to the instruction for the architected register. The renamed physical register remains the same as it was when it was not renamed.

In keeping with the example illustrated in FIG. 2, the token count in column 110B in RMT 102B for the architected register R5 is "1" and the token count for physical register P2 in column 116B is "1." Thus, the method 300 does not assign a new physical register to the architected register R5 for the instruction. The register P2 in the column 108B remains P2.

In a block 322, the method 300 increments the token count at the RMT position for the architected register to "T+1." The method 300 also increments the token count at the PRF position for the new, in use physical register to "T+1."

In keeping with the example illustrated in FIG. 2, the token count at the RMT 102B position for the architected register R5 is incremented to "T+1." The token count at the PRF 104C position for P2 also is incremented to "T+1." This results in, at point 206, the token count in column 110C in RMT 102C for the architected register R5 and the physical register P2 being "2" and the token count for physical register P2 in column 116C of the PRF 104C being "2."

In a block 324, the method 300 ensures that the instruction remembers that the previous physical register also is the new physical register, and that the token for the instruction is "T+1." In keeping with the example illustrated in FIG. 2, instruction 210D remembers that physical register P2 still has the name P2 and that the token in column 110C has a result of "2."

At this point, the obtained instruction is freed for reuse by the renaming architecture illustrated in FIG. 2 to enter the pipeline and execute.

In the meantime, when there is a second generation of architected register R5, for purposes of illustration assume a status of the architected register R5 being currently renamed physical register P2 and the token for the physical register P2 being non-zero (e.g., P2's token="1"). Although the physical register P2 already has been used for a first generation of R5, the physical register P5 is reused for the second generation of R5. Instead of assigning a new physical register to the second generation of R5, the renaming architecture reuses the physical register P2 and increments its token count from "1" to "2." The renaming architecture also increments the token count in the PRF 104 from "1" to "2."

With token count for the physical register P2 being "2" and the token count for the PRF being "2" assume further that the first producer finishes at this point. When the first producer attempts to write its production result into the physical register P2, the first producer finds that the token count in physical register P2 is "2" and the first producer's token count is "1." Under these circumstances, the first producer is not allowed to write its result into the physical register P2 because the token counts do not match.

Figure 4:
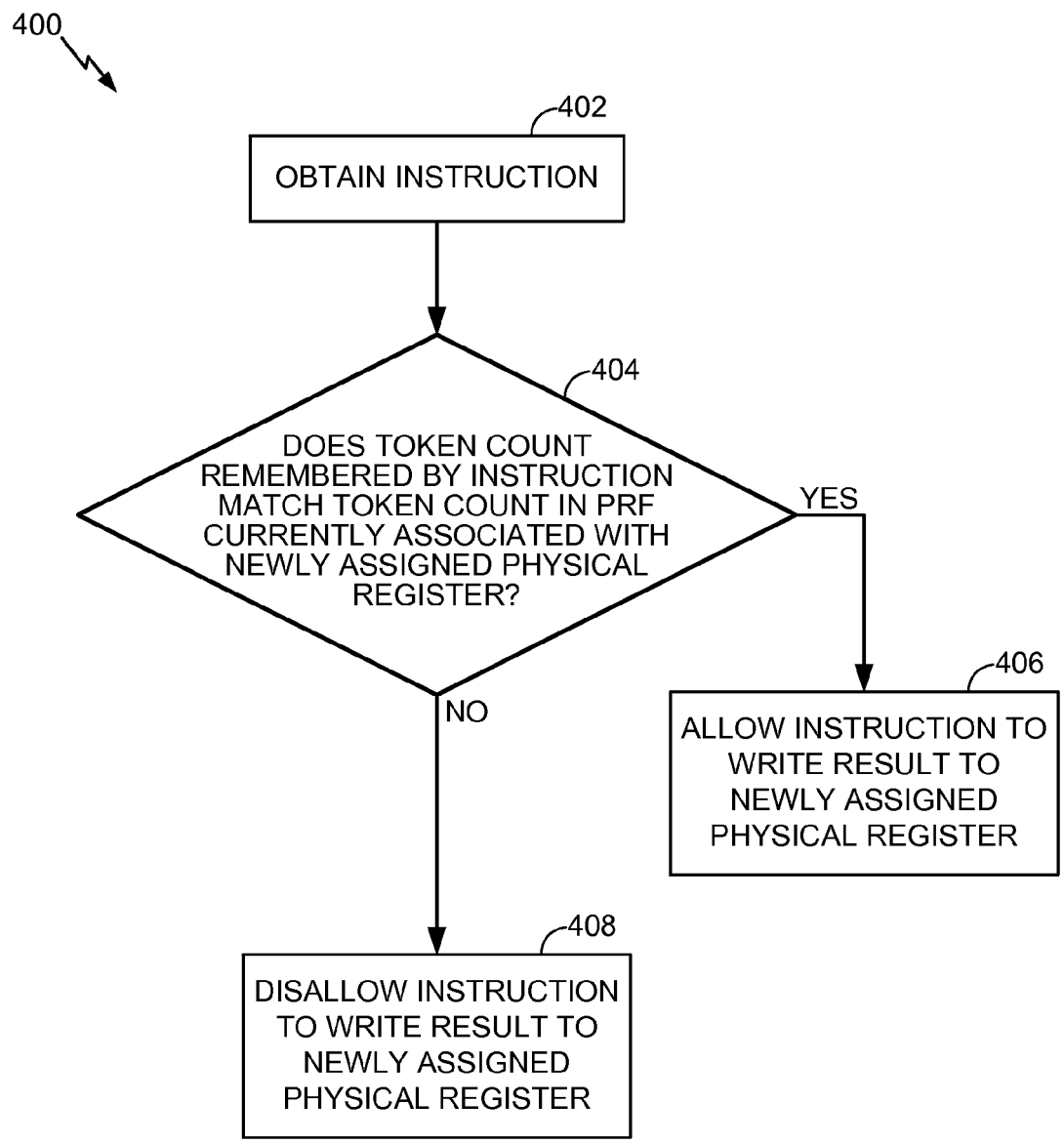
FIG. 4 illustrates an example flow diagram of a methodology for selective renaming in a processor at an instruction completion stage according to an implementation.

Example Token-Based Selective Register Renaming Method at Instruction Completion Stage FIG. 4 illustrates an example flow diagram of the method 400 for selective renaming in a processor at instruction completion time according to an implementation. As used herein, instruction completion time is when an instruction has been fetched and executed but whose result has not yet been written into an assigned physical register.

In a block 402, the method 400 obtains an instruction. In keeping with the example illustrated in FIG. 2, the method 400 obtains an instruction that produces a second generation of architected register R5. The instruction that produces a second generation of architected register R5 has remembered that its token count is "1."

In a block 404, the method 400 determines whether the token count remembered by the obtained instruction corresponds to and/or matches the token in the PRF that is currently associated with the assigned physical register. If in block 404 the method 400 determines that the token count remembered by the obtained instruction corresponds to and/or matches the token in the PRF that is currently associated with the assigned physical register, then control of method 400 passes to a block 406. In keeping with the example illustrated in FIG. 2, the method 400 determines whether the instruction's token count of "1" corresponds to and/or matches the token count of "1" that is in the PRF column 116B that is currently associated with the assigned physical register P2.

In block 406, because the instruction's token count of "1" corresponds to and/or matches the token count of "1" that is in the PRF column 116B that is currently associated with the assigned physical register P2 the method 400 permits and/or allows the instruction that produces a second generation of architected register R5 to write its result into the assigned physical register P2 in the PRF 104.

If, on the other hand, in block 404 the method 400 determines that the token count remembered by the obtained instruction does not correspond to and/or match the token in the PRF 104 that is currently associated with the assigned physical register, then control of method 400 passes to a block 408.

In keeping with the example illustrated in FIG. 2, the method 400 determines whether the instruction's token count of "1" corresponds to and/or matches the token count of "2" that is in the PRF column 116C that is currently associated with the physical register P2. Thus, in block 408, the instruction that produces the second generation of architected register R5 is not allowed to write its result into the physical register P2 because the token counts do not match.

Figure 5:
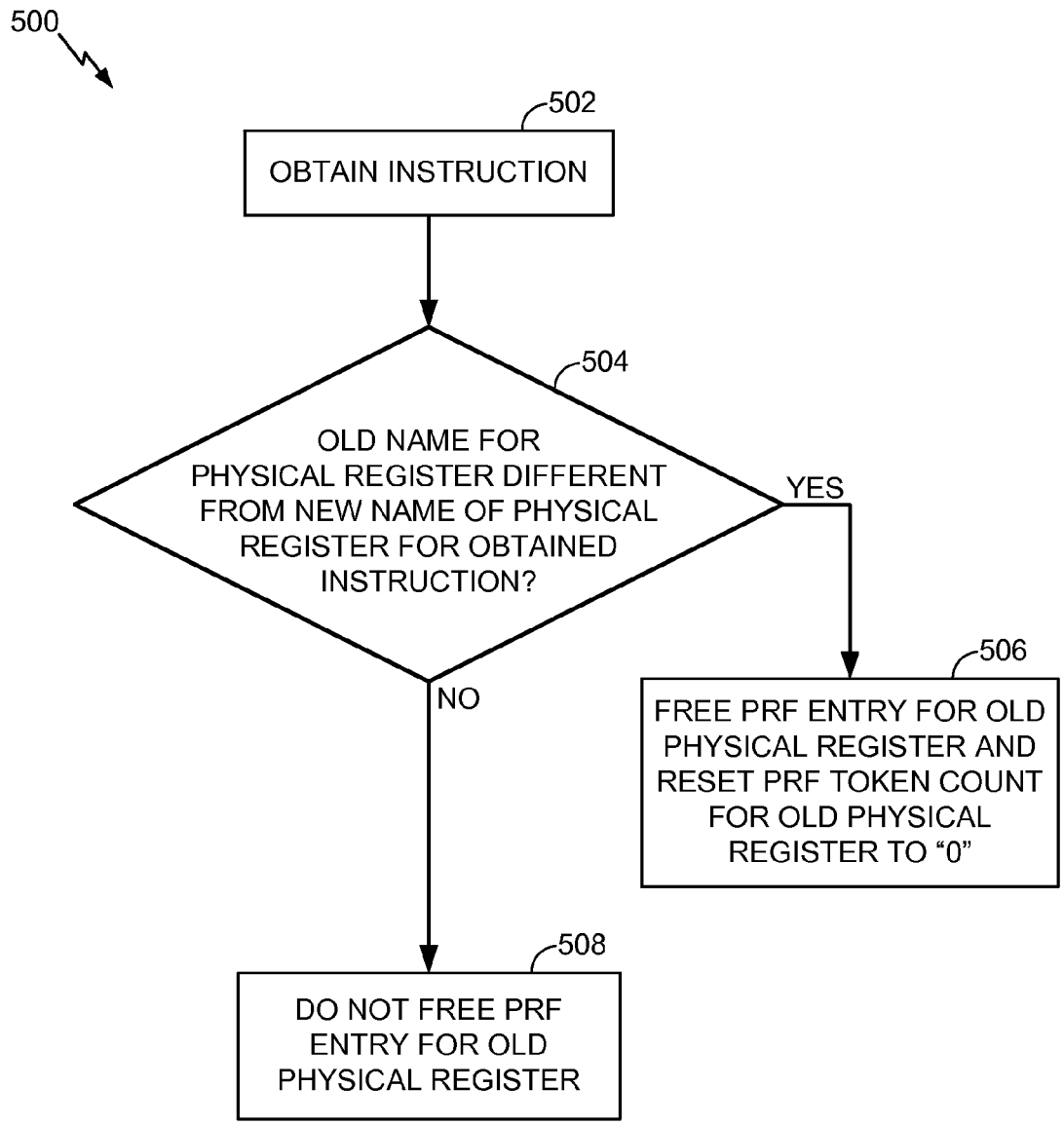
FIG. 5 illustrates an example flow diagram of a methodology for selective renaming in a processor at an instruction commit/retire stage according to an implementation.

Example Token-Based Selective Register Renaming Method at Instruction Commit/Retire Stage FIG. 5 illustrates an example flow diagram of the method 500 for selective renaming in a processor at instruction commit/retire time according to an implementation. As used herein, instruction commit/retire time is when an instruction has been fetched and executed, whose result has been written into an assigned physical register, and the physical register that was previously assigned to the architected register is freed.

In a block 502, the method 500 the method 500 obtains an instruction. In one or more implementations, the obtained instruction produces another generation of architected register R5, which is assigned a physical register.

In a block 504, the method 500 determines whether the name of the assigned physical register is different from a newly assigned physical register. For example, if the name of the assigned physical register is P2 and the name of the newly assigned physical register is P3, which is different from P2, then in block 506 method 500 frees the entry in the PRF 104 that is assigned to the physical register P2 and resets the token count in the PRF 104 for the physical register P2 to "0." In one or more implementations, the entries in the PRF 104 are freed using known techniques. When the physical register P2 is freed the token count for the physical register is reset to "0" (column 110D).

If, on the other hand, the method 500 determines that the name of the assigned physical register is not different from a newly assigned physical register, then in a block 508 the physical register is not freed.

Example Instruction Sequence ID-Based Selective Register Renaming Method

In some alternative implementations, instead of using tokens to uniquely tie a particular generation of an architected register to a particular physical register, it is possible to also use any other unique identifier, such as an instruction sequence ID (e.g., Re-Order Buffer ID, Matrix ID, etc.). In this implementation, the RMT 102 would carry a single bit per entry, indicating whether the associated architected register has been renamed since the last PPF instruction. A PPF instruction resets these bits to "0," and a "0" indicates that a new rename is to be assigned to the production. Once a new rename is assigned for an architected register, the corresponding bit is set to a "1." The bit remains "1" until the next PPF instruction, and this "1" indicates that a new rename need not be assigned to this architected register.

In this alternative implementation, the PRF 104, instead of a token, holds one instruction sequence identifier (ID) per physical register. Every producer instruction sends its sequence ID to the assigned physical register (whether it is a newly assigned physical register or not). The producer instruction carries its instruction sequence ID in its payload (as is conventional). Upon completion, the producer instruction writes the result to its assigned physical register if its instruction sequence ID corresponds to and/or matches that of the physical register. Upon an instruction commit, the previous rename is freed for reuse if it is different from the current rename. Whenever a physical register is freed for reuse, the instruction sequence ID associated with the physical register is reset to some identifiably invalid or initial state (such as "0").

Example Selective Register Renaming Method
Using Data Forwarding Network

In modern processor hardware, there are typically pipeline stages in the front end of the processor pipeline where the hardware has visibility to a group of program-order-consecutive instructions at the same time (i.e. in the same clock cycle). When this happens, it is possible to take advantage of selective register renaming as described herein without the use of the RMT tokens or PRF identifiers such as tokens and/or instruction sequence IDs.

For example, if two instructions in the group of program-order-consecutive instructions generate the same architectural register and there are no PPF instructions between those two instructions, the older of the two program-order-consecutive instructions need not be assigned a physical register name to hold its production result. Instead, all consumers of the older of the two program-order-consecutive instructions obtain the production result via the data forwarding network.

Note that all the consumers of the older producer result can be identified in the same clock cycle because there is a second production result that is observed in the same clock cycle. That is, any consumers of the first production result must be in between the first and second production results. Therefore, the older producer as well as consumers of its result need not use up a physical register name. This implementation trades off the additional hardware used for full selective renaming (such as tokens and token management), for use across instructions that are simultaneously visible at a pipeline stage.

Figure 6:
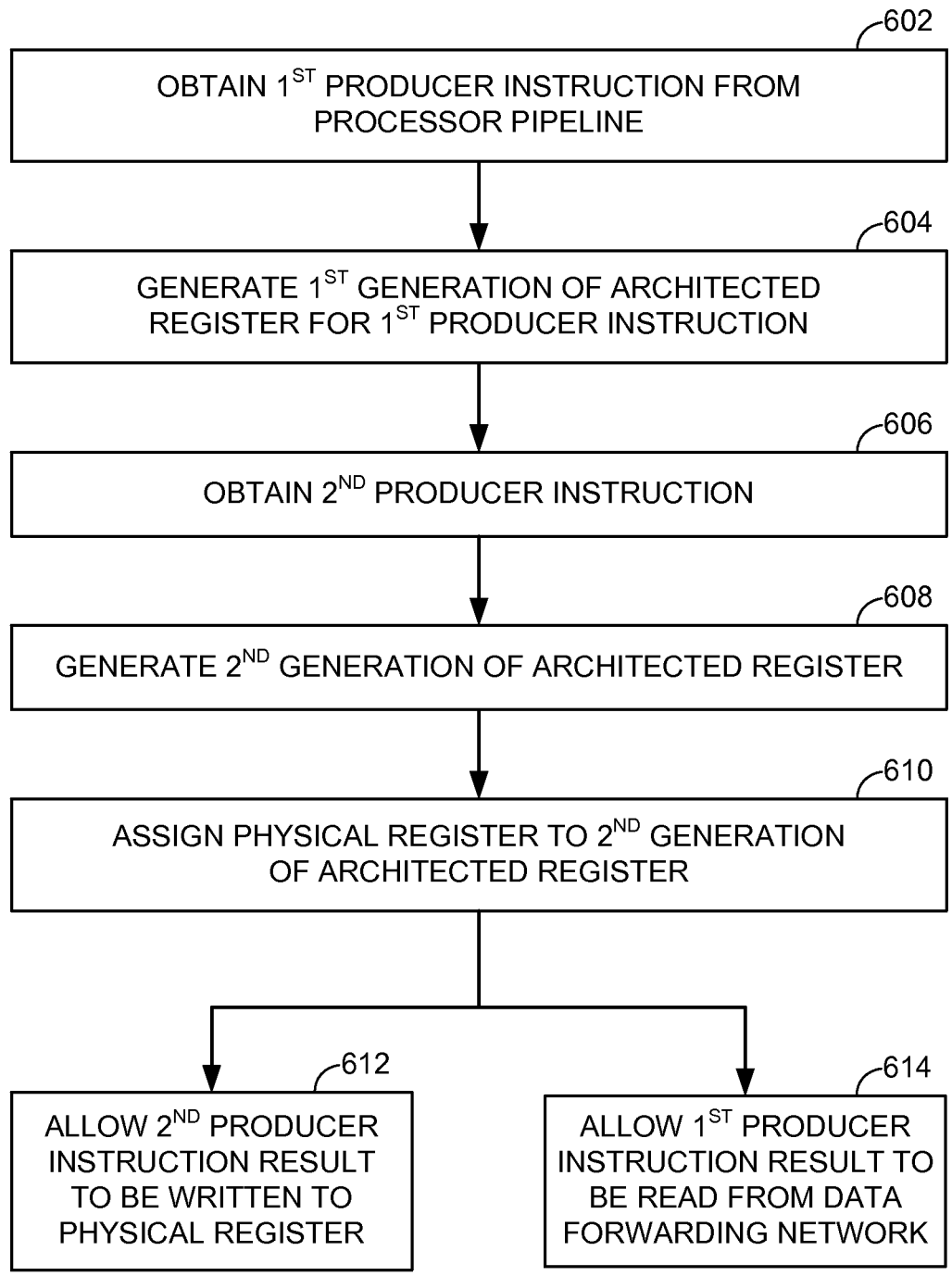
FIG. 6 illustrates an example flow diagram of a methodology for selective renaming in a processor using a data forwarding network according to an alternative implementation.

FIG. 6 illustrates an example flow diagram of a methodology for selective renaming in a processor using a data forwarding network (bypass network) according to an alternative implementation.

In a block 602, the method 600 obtains a first instruction from a processor pipeline. In one or more implementations, the instruction is a producer instruction. Returning to the selective renaming structure illustrated in FIG. 2, the processor 100 obtains instruction 210A from the instruction pipeline 210.

In a block 604, the method 600 generates a first generation of an architected register for the first producer instruction. The first architected register may be generated according to the ISA for the particular processor. Returning to FIG. 2, the instruction 210A generates the architected register R5.

In a block 606, the method 600 obtains a second producer instruction from the processor pipeline. Returning to FIG. 2, the processor 100 obtains instruction 210B from the pipeline.

In a block 608, the method 600 generates a second generation of the architected register according to the ISA for the particular processor. Returning to FIG. 2, the processor 100 generates the architected register R5.

In a bock 610, the method 600 assigns a physical register to the second generation of the architected register. Returning to FIG. 2, the processor 100 assigns the physical register P2 to instruction 210B.

In a block 612, the method 600 allows the second producer instruction result to be written to the assigned physical register. Returning to FIG. 2, the processor 100 allows instruction 210B to write its result to physical register P2.

In a block 614, the method 600 allows the first producer instruction result to be read from a data forwarding network. Returning to FIG. 1 and FIG. 2, the processor 100 allows instruction 210B result to be read from a forwarding network using the data forwarding mechanism 124.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the order described above. Furthermore, not every illustrated step and decision may be required in every embodiment/variant in accordance with the invention, while some steps and decisions that have not been specifically illustrated may be desirable or necessary in some embodiments/variants in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method of operating a processor, the processor comprising a rename map table (RMT) to store entries indicating assignments of physical registers to architected registers, each physical register having an associated physical register token and each architected register in an RMT entry having an associated architected register token, the method comprising:
   setting all architected register tokens in the RMT to a reset value in response to obtaining a potential pipeline flush instruction from a processor pipeline;
   in response to obtaining a producer instruction, where the producer instruction identifies an architected register as a target for a result of the producer instruction when executed:
     provided the architected register token associated with the architected register has a value equal to the reset value, assigning in the RMT a physical register indicated as free to the architected register and changing the value of the architected register token associated with the architected register to a value different from the reset value; and
     changing the value of the physical register token associated with the physical register to indicate the producer instruction; and
   allowing the producer instruction result to be written to the physical register assigned to the architected register in the RMT if the physical register token associated with the physical register has a value indicating the producer instruction.

2. The method of claim 1, wherein said changing the value of the architected register token associated with the architected register comprises:
   incrementing the value of the architected register token.

3. The method of claim 1, wherein said changing the value of the physical register token associated with the physical register to indicate the producer instruction comprises:
   incrementing the value of the physical register token; and
   including the value of the physical register token with the producer instruction.

4. The method of claim 3, wherein said allowing the producer instruction result to be written to the physical register assigned to the architected register in the RMT if the physical register token associated with the physical register has a value indicating the producer instruction comprises:
   matching the value of the physical register token associated with the physical register with the value included with the producer instruction.

5. The method of claim 1, wherein said changing the value of the physical register token associated with the physical register to indicate the producer instruction comprises:
   setting the value of the physical register token to an instruction identifier that uniquely identifies the producer instruction.

6. The method of claim 1, wherein the reset value is zero.

7. The method of claim 1, wherein the architected register is defined by an instruction set architecture.

8. The method of claim 1, wherein the potential pipeline flush instruction is the producer instruction.

9. A method of operating a processor, the processor comprising a rename map table (RMT) to store entries indicating assignments of physical registers to architected registers, each architected register in an RMT entry having an associated architected register token and each physical register having an associated physical register token, the method comprising:
   setting all architected register tokens in the RMT to a reset value in response to obtaining a potential pipeline flush instruction from a processor pipeline;
   in response to obtaining a first producer instruction, where the first producer instruction identifies an architected register as a target for a result of the first producer instruction when executed, provided the architected register token associated with the architected register has a value equal to the reset value, assigning in the RMT a first physical register indicated as free to the architected register and changing the value of the architected register token associated with the architected register to a value different from the reset value; and
   in response to obtaining a second producer instruction following the first producer instruction in program order where the second producer instruction identifies the architected register as a target for a result of the second producer instruction when executed, assigning in the RMT a second physical register indicated as free to the architected register and, provided the architected register token associated with the architected register has a value not equal to the reset value, freeing the first physical register.

10. The method of claim 9, further comprising:
setting the physical register token associated with the physical register to a value indicative of the physical register being free.

11. A processor comprising:
a physical register file comprising physical registers;
a rename map table (RMT) to store entries indicating assignments of the physical registers to architected registers, each physical register having an associated physical register token and each architected register in an RMT entry having an associated architected register token; and
a pipeline to
   set all architected register tokens in the RMT to a reset value in response to obtaining a potential pipeline flush instruction;
   in response to obtaining a producer instruction, where the producer instruction identifies an architected register as a target for a result of the producer instruction when executed:
     provided the architected register token associated with the architected register has a value equal to the reset value, assign in the RMT a physical register indicated as free to the architected register and change the value of the architected register token associated with the architected register to a value different from the reset value; and
change the value of the physical register token associated with the physical register to indicate the producer instruction; and
allow the producer instruction result to be written to the physical register assigned to the architected register in the RMT if the physical register token associated with the physical register has a value indicating the producer instruction.

12. The processor of claim 11, wherein changing the value of the architected register token associated with the architected register comprises:
incrementing the value of the architected register token.

13. The processor of claim 11, wherein changing the value of the physical register token associated with the physical register to indicate the producer instruction comprises:
incrementing the value of the physical register token; and
including the value of the physical register token with the producer instruction.

14. The processor of claim 13, wherein allowing the producer instruction result to be written to the physical register assigned to the architected register in the RMT if the physical register token associated with the physical register has a value indicating the producer instruction comprises:
matching the value of the physical register token associated with the physical register with the value included with the producer instruction.

15. The processor of claim 11, wherein changing the value of the physical register token associated with the physical register to indicate the producer instruction comprises:
setting the value of the physical register token to an instruction identifier that uniquely identifies the producer instruction.

16. The processor of claim 11, wherein the reset value is zero.

17. The processor of claim 11, wherein the architected register is defined by an instruction set architecture.

18. The processor of claim 11, wherein the potential pipeline flush instruction is the producer instruction.

19. A processor comprising:
a physical register file comprising physical registers;
a rename map table (RMT) to store entries indicating assignments of the physical registers to architected registers, each architected register in an RMT entry having an associated architected register token and each physical register having an associated physical register token; and
a pipeline to
set all architected register tokens in the RMT to a reset value in response to obtaining a potential pipeline flush instruction from a processor pipeline;
in response to obtaining a first producer instruction, where the first producer instruction identifies an architected register as a target for a result of the first producer instruction when executed, provided the architected register token associated with the architected register has a value equal to the reset value, assign in the RMT a first physical register indicated as free to the architected register and change the value of the architected register token associated with the architected register to a value different from the reset value; and in response to obtaining a second producer instruction following the first producer instruction in program order where the second producer instruction identifies the architected register as a target for a result of the second producer instruction when executed, assign in the RMT a second physical register indicated as free to the architected register and, provided the architected register token associated with the architected register has a value not equal to the reset value, free the first physical register.

20. The processor of claim 19, the pipeline to:
set the physical register token associated with the physical register to a value indicative of the physical register being free.

21. A processor comprising:
a physical register file comprising physical registers;
a rename map table (RMT) to store entries indicating assignments of the physical registers to architected registers, each physical register having an associated physical register token and each architected register in an RMT entry having an associated architected register token;
means for setting all architected register tokens in the RMT to a reset value in response to obtaining a potential pipeline flush instruction from a processor pipeline;
means for assigning in the RMT and changing the values of the architected register tokens and the physical register tokens, wherein in response to obtaining a producer instruction, where the producer instruction identifies an architected register as a target for a result of the producer instruction when executed:
provided the architected register token associated with the architected register has a value equal to the reset value, assigning in the RMT a physical register indicated as free to the architected register and changing the value of the architected register token associated with the architected register to a value different from the reset value; and
changing the value of the physical register token associated with the physical register to indicate the producer instruction; and
means for allowing the producer instruction result to be written to the physical register assigned to the architected register in the RMT if the physical register token associated with the physical register has a value indicating the producer instruction.

22. The processor of claim 21, wherein the means for assigning in the RMT and changing the values of the architected register tokens and the physical register tokens comprises:
incrementing the value of the architected register token.

23. The processor of claim 21, wherein the means for assigning in the RMT and changing the values of the architected register tokens and the physical register tokens comprises:
incrementing the value of the physical register token; and
including the value of the physical register token with the producer instruction.

24. The processor of claim 23, wherein the means for allowing the producer instruction result to be written to the physical register assigned to the architected register in the RMT if the physical register token associated with the physical register has a value indicating the producer instruction comprises:

matching the value of the physical register token associated with the physical register with the value included with the producer instruction.

25. The processor of claim 21, wherein the means for assigning in the RMT and changing the values of the architected register tokens and the physical register tokens comprises:
setting the value of the physical register token to an instruction identifier that uniquely identifies the producer instruction.

26. The processor of claim 21, wherein the reset value is zero.

27. The processor of claim 21, wherein the architected register is defined by an instruction set architecture.

28. The processor of claim 21, wherein the potential pipeline flush instruction is the producer instruction.

29. A processor comprising:
a physical register file comprising physical registers;
a rename map table (RMT) to store entries indicating assignments of the physical registers to architected registers, each architected register in an RMT entry having an associated architected register token and each physical register having an associated physical register token;
means for setting all architected register tokens in the RMT to a reset value in response to obtaining a potential pipeline flush instruction from a processor pipeline; and
means for assigning in the RMT and changing the values of the architected register tokens and the physical register tokens, wherein in response to obtaining a first producer instruction, where the first producer instruction identifies an architected register as a target for a result of the first producer instruction when executed, provided the architected register token associated with the architected register has a value equal to the reset value,
assigning in the RMT a first physical register indicated as free to the architected register and changing the value of the architected register token associated with the architected register to a value different from the reset value; and
in response to obtaining a second producer instruction following the first producer instruction in program order where the second producer instruction identifies the architected register as a target for a result of the second producer instruction when executed, assigning in the RMT a second physical register indicated as free to the architected register and, provided the architected register token associated with the architected register has a value not equal to the reset value, freeing the first physical register.

30. The processor of claim 29, the means for assigning in the RMT and changing the values of the architected register tokens and the physical register tokens further comprising:
setting the physical register token associated with the physical register to a value indicative of the physical register being free.

* * * * *